Aug. 29, 1950     J. G. BURMIST     2,520,453
BEARING
Filed May 25, 1945

Inventor:
John G. Burmist,
By B. T. Wolversmith 2nd
Attorney.

Patented Aug. 29, 1950

2,520,453

UNITED STATES PATENT OFFICE 2,520,453

BEARING

John G. Burmist, Philadelphia, Pa.

Application May 25, 1945, Serial No. 595,852

1 Claim. (Cl. 308—6)

This invention relates to bearings and more particularly to bearings for vibration test stands and the like.

It is the principal object of the present invention to provide a bearing for parts which are movable linearly with respect to each other such as the movable plate and fixed frame of a testing machine.

It is a further object of the present invention to provide a bearing which will be rugged and free from likelihood of failure in use, while simple in its construction.

It is a further object of the present invention to provide a bearing which, while reducing friction, will have a minimum of lost motion.

Other objects of the invention will be apparent from the specification and claim.

The nature and characteristic features of the invention will be more readily understood from the following description, taken in connection with the accompanying drawings forming a part hereof, in which.

Figure 1:
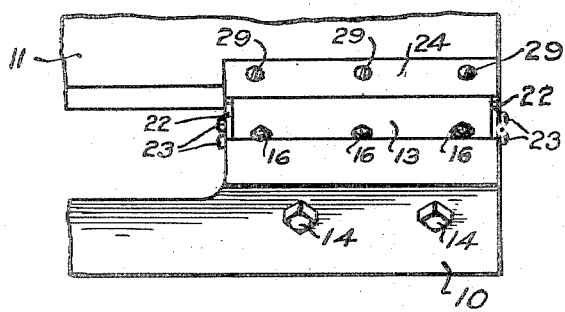
Figure 1 is a view in front elevation of a portion of a vibration test stand employing bearings in accordance with the present invention.
Figure 2:
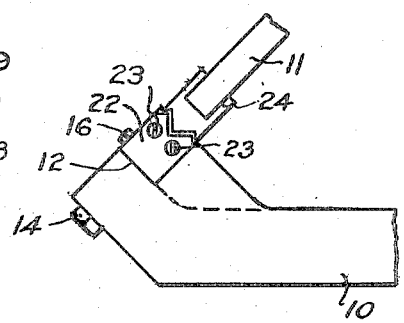
Fig. 2 is a side elevational view, as seen from the right of Fig. 1.
Figure 3:
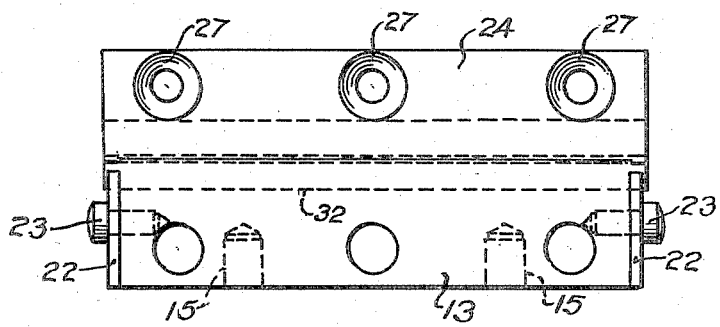
Fig. 3 is a front elevational view of a bearing in accordance with the present invention, removed from the test stand.
Figure 4:
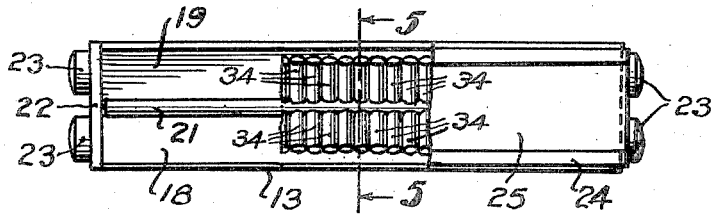
Fig. 4 is a top or plan view of the bearing shown in Fig. 3, parts being broken away to show the details of construction.

It should, of course, be understood that the description and drawings herein are illustrative merely, and that various modifications and changes may be made in the structure disclosed without departing from the spirit of the invention.

Referring more particularly to the drawings, a portion of the frame of a vibration test stand is shown at 10, and carries a plate 11 thereon for linear longitudinal movement in a plane, which plane may have a pre-determined inclination. The frame portion 10 is recessed, as at 12, for the reception of a fixed bearing block 13. A suitable number and arrangement of recesses 12 are provided at the top and bottom of the frame 10 in accordance with the size thereof. The bearing block 13 is preferably rigidly secured to the frame portion 10 by upwardly extending bolts 14, which engage in threaded holes 15 in the block 13, and by inwardly extending bolts 16 which extend through holes 17 in the block 10.

Figure 5:
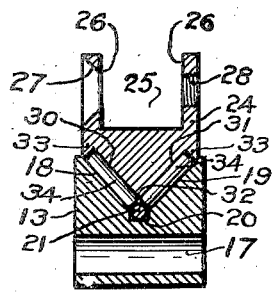
Fig. 5 is a vertical sectional view taken approximately on the line 5—5 of Fig. 4.

The block 13 is preferably provided with a pair of longitudinally extending finished plane faces 18 and 19 angularly disposed and terminating at a groove 20. An elongated cylindrical rod 21 is provided in the groove 20 and extends outwardly above and beyond the terminal edges of the faces 18 and 19 (see Fig. 5).

The bearing block 13 is provided at its ends with retaining plates 22, held in position by bolts 23. The plates 22 restrain the rod 21 from longitudinal displacement with respect to the groove 20.

A movable bearing block 24 is also provided and the plate 11 is secured thereto. The bearing block has a central groove 25 with side faces 26 for engagement with the plate 11. In order to hold the plate 11 and the bearing block 24 in engagement, the bearing block 24 is provided with bolt holes, chamfered at one end 27 and threaded at the other end 28, in which bolts 29 are mounted.

The bearing block 24 is provided with longitudinally extending finished plane faces 30 and 31, angularly disposed and meeting in a central longitudinally extending edge 32. The faces 30 and 31 are adapted to be spaced from the faces 18 and 19 as hereinafter explained. The faces 18 and 30 are parallel and the faces 19 and 31 are parallel. At the outer ends of the faces 30 and 31 positioning and retaining ledges 33 are provided.

The movable block 24 is preferably longer than the fixed block 13 to permit of linear sliding movement.

In the space between the face 18 and the face 30 and in the space between the face 19 and the face 31 a plurality of small pins or roller rods 34 are provided. The roller rods 34 bear at their inner ends, adjacent the edge 32, on the rod 21 and are positioned and alined thereby. Outward displacement of the roller rods 34 is prevented by the ledges 33 and the retaining plates 22. The length of the movable block 24 also prevents displacement of the rods 34. The number and diameter of the roller rods 34 between the retaining plates 22 are preferably such as to provide a clearance which permits of the rods 34 freely and loosely rotating in use.

Upon assembly of the plate 11 with respect to the frame 10 the faces 30 and 31 of the movable block 24 are in engagement with the roller rods 34, which roller rods 34 are in engagement with the faces 18 and 19 of the fixed block 13. The roller rods 34 are also held in alinement by and may engage with the rod 21 or with the ledges 33, depending upon the positioning of the bearing. Upon linear longitudinal movement of the plate 11 with respect to the frame 10 the rods 34 roll between the pairs of parallel faces 18 and 30 and 19 and 31, with their axes remaining in parallel relationship.

I claim:

In a bearing for linear movement, a pair of relatively movable block members, each of said members having a pair of angularly disposed faces with inner and outer longitudinal edges, the faces on one block being spaced from and respectively parallel to the faces of the other block, one of said block members having a longitudinal recess at the junction of the inner edges of the faces thereof, a positioning rod disposed in said recess, a plurality of laterally disposed roller members in the spaces between said faces and in engagement at their lower ends with said positioning rod, the spaces between said roller members being less than the diameters of said roller members, and end members on said one of said block members for retaining said positioning rod and said roller members in position.

JOHN G. BURMIST.

REFERENCES CITED

The following references are of record in the file of this patent:

UNITED STATES PATENTS

| Number | Name | Date |
|---|---|---|
| 2,045,464 | Harley | June 23, 1936 |
| 2,173,587 | Huffman | Sept. 19, 1939 |

FOREIGN PATENTS

| Number | Country | Date |
|---|---|---|
| 526,230 | Germany | 1931 |
| 473,026 | Great Britain | 1937 |